United States Patent Office 3,673,014
Patented June 27, 1972

3,673,014
FLARE COMPOSITION
George A. Lane, Midland, and William Arthur Smith, Westland, Mich., assignors to The Dow Chemical Company, Midland, Mich.
No Drawing. Filed Oct. 6, 1970, Ser. No. 78,642
Int. Cl. C06d 1/10
U.S. Cl. 149—19  7 Claims

ABSTRACT OF THE DISCLOSURE

Disclosed is an illuminating flare composition which comprises a particulate alkali metal nitrate or perchlorate, as oxidizer, particulate magnesium as fuel, together with a binder. The binder comprises the reaction product of an amine or acid anhydride curable epoxy resin and an amine terminated composition or acid anhydride wherein the epoxy resin comprises from 30 to 70 percent of the binder. The binder is further characterized by containing at least 30 percent oxygen and making up from 18 to 24 percent of the flare composition.

---

The invention herein described was made in the course of or under a contract or subcontract thereunder with the Department of the Army.

BACKGROUND OF THE INVENTION

Flare compositions employing particulate magnesium and an alkali metal nitrate or perchlorate as oxidizer are known. The magnesium and oxidizer may be incorporated into a granular type flare by mixing them with a polyester binder and pressing at pressures up to 4000 p.s.i. or higher. Pressing at these elevated pressures is a hazardous as well as expensive operation. Also, the requirement that a flare be pressed at high pressures makes the manufacture of certain grain sizes and configurations impractical.

A castable flare formulation, i.e. a composition which can be poured into a mold and fully cured at ambient or moderately elevated temperatures, is desirable since it makes possible the fabrication of flares of various sizes and configurations which are not readily prepared by pressing techniques. Bash and Lane disclose, in U.S. Pat. 3,432,370, that castable flares are prepared by mixing an oxidizer and fuel with a binder comprising an amine curable epoxy resin and the nitrate or perchlorate salt of an amine terminated polyglycol as binder with a binder level of 12 percent or more of the flare composition. At these binder levels, the illuminating efficiency of this composition, expressed as candle sec./g., decreases rapidly to a low level. Only by reducing the binder level in this composition to below about 12 percent, can high light output be obtained. By so reducing the binder level; however, the composition loses its pour castability and must be formed into a granular flare by vibrating, tamping, or pressing.

It is an object of the present invention to provide a composition which is pour castable, i.e. has a viscosity of less than $5 \times 10^5$ centipoise and is curable to a shaped flare candle at moderately elevated temperatures.

A further object is to provide such compositions which have efficiencies up to and greater than 20,000 candle seconds per gram.

SUMMARY OF THE INVENTION

The invention is an illuminating flare composition which comprises an alkali metal nitrate or perchlorate as oxidizer, finely divided magnesium as fuel and a binder containing at least 30 percent oxygen.

The maximum dimension of the magnesium particles is greater than about 25 and less than about 250 microns ($\mu$). These particles are preferably essentially spherical to improve the physical properties of the uncured composition. As used herein, the term magnesium is intended to refer to elemental magnesium or alloys containing greater than 70% magnesium. The oxidizer particles range in size from 10 to 750$\mu$ in their longest dimension.

The binder is the reaction product of an amine or acid anhydride curable epoxy resin and an amine terminated polyalkylene oxide; alkylene polyamine; alkyl, aryl or mixed alkyl-aryl amine or acid anhydride. The binder comprises from 18 to 24 percent of the flare composition and contains at least 30 percent chemically bound oxygen. From 30 to 70 percent of the binder is made up of the epoxy resin with the remainder being either the amine terminated composition or acid anhydride. Unless otherwise specified, all percentages used herein are on a total formulation weight basis.

DESCRIPTION OF PREFERRED EMBODIMENTS

The flare composition of the present invention contains from 43 to 70 percent particulate magnesium, 21 to 50 percent oxidizer and 18 to 24 percent binder. In a preferred embodiment, the composition contains from 45 to 55 percent essentially spherical magnesium particles having a mean particle size distribution of from 125 to 250$\mu$ in diameter. Bi- or multi-modal size distribution is preferred for most efficient packing of the magnesium particles. Sodium nitrate particles having mean diameters from 25 to 250$\mu$ are preferred for use as the oxidizer. The amount of oxidizer is preferably from 25 to 33 percent of the flare composition.

A number of amine terminated polyglycol cured epoxy resin binders have been found to be especially effective. Examples of useful epoxy resins are the diglycidyl ether of polypropylene glycol containing 27 percent oxygen, glycerin diglycidyl ether (GDGE) and a glycerine glycidyl ether having an average functionality of between 2 and 3 (GDGE 2/3). The latter two resins have an oxygen content, determined by analysis, of at least 32 percent. Additionally, ethylene glycol diglycidyl ether, polyethylene glycol diglycidyl ethers and the polyglycidyl esters of polyfunctional acids may readily be used.

The epoxy resins are preferably cured with an amine terminated polypropylene oxide having an average molecular weight of 250 or the nitrate or perchlorate salt thereof. The amine terminated polypropylene oxide, hereinafter referred to as APO, has an analyzed oxygen content of 23 percent. The nitrate and perchlorate salts of APO, hereinafter referred to as APO nitrate and APO perchlorate have analyzed oxygen contents of 30 percent and are therefore preferred for use as curing agents. Other amine terminated polyalkylene oxides, e.g. polyethylene oxide or polybutylene oxide, which are curable liquids and contain the requisite high percentages of oxygen, may be used. The epoxy resins may also be cured with an acid anhydride, e.g. maleic, fumaric, succinic, and pyromellitic anhydride to provide a binder having a high oxygen content. Pour castable flare compositions having viscosities of less than $5 \times 10^5$ cps. are prepared containing from 18 to 24 percent of the epoxy resin-amine terminated polyalkylene oxide binder.

In general, the flare mix is prepared by first stirring the binder ingredients, which are normally liquid, to homogeneity. The magnesium, preblended when multi-modal magnesium is used, is then added to the binder with additional mixing to again reach homogeneity. Finally the oxidizer is added and stirred until homogeneity and adequate fluidity is obtained. For castable compositions, the mix is then poured into molds or flare cases and cured for at least about 4 hours in a 60° to 70° C. oven. Flare candles cured in molds may be removed after curing and put into flare cases. Those compositions which are not of sufficiently low viscosity for pour casting can be placed in a container for curing by conventional means such as tamping, vibrating, or pressing. The flares are ignited by means of a fuse and a small amount of igniter mix and their efficiency determined by light output measurements. Several flares were prepared by this general method. The following examples illustrate the flare compositions thus prepared and their efficiency.

Examples 1–3

Flare compositions weighing 410 grams were prepared containing 48 percent granular magnesium particles having a multi-modal distribution of from 105 to 350μ and 34 percent of 200 mesh sodium nitrate. Three distinct compositions were prepared using glycerin diglycidyl ether (GDGE) as the epoxy resin. The curing agent, which made up 33–44 percent of the binder composition, was the variable in each case. Four 100 gm. flares of each composition were prepared and tested for efficiency. Table I illustrates the binder compositions and efficiencies of the flares prepared in this manner.

TABLE I

| Ex. No. | Binder | Composition | Weight percent oxygen in binder | Average efficiency, candle-sec./gm.* | Average intensity, candles |
|---|---|---|---|---|---|
| 1 | GDGE+APO perchlorate. | 1.67:1 | 31 | 37,500 | 60,400 |
| 2 | GDGE+APO nitrate. | 1.33:1 | 31 | 40,600 | 56,100 |
| 3 | GDGE+maleic anhydride. | 2:1 | 38 | 33,600 | 89,100 |

$$*\text{Efficiency} = \frac{\int_{t_0}^{t_f} I \, dt}{W}$$

where I is intensity in candles, t is time in seconds and W is flare weight in grams.

Examples 4–5

Flare compositions were prepared in a manner similar to Example 1, containing 48 percent bimodal 200μ and 125μ diameter magnesium, 34 percent of 30μ diameter NaNO₃ and 18 percent binder. In two cases the epoxy resin was GDGE. In one case the resin consisted of GDGE 2/3. As in Example 1, the curing agent, which made up 38–43 percent of the binder composition, was varied in each case. Table II illustrates the binder compositions employed and efficiency of two flares prepared in this manner.

TABLE II

| Ex. No. | Binder | Composition | Weight percent oxygen in binder | Average efficiency, candle-sec./gm. | Average intensity, candles |
|---|---|---|---|---|---|
| 4 | GDGE 2/3 + APO perchlorate. | 1.56:1 | 32 | 39,350 | 65,550 |
| 5 | GDGE + APO nitrate. | 1.33:1 | 31 | 40,150 | 74,300 |

Examples 6–8

Flare compositions were prepared as in the previous examples which contained 44.5 percent bimodal, 200μ and 125μ diameter, magnesium, 31.5 percent of 30μ NaNO₃ and 24 percent binder. Table III illustrates three flare compositions, which were found to be pour castable at room temperature. The curing agent made up 37–38 percent of the binder.

TABLE III

| Ex. No. | Binder | Composition | Weight percent oxygen in binder | Average efficiency, candle-sec./gm. | Average intensity, candles |
|---|---|---|---|---|---|
| 6 | GDGE + APO perchlorate. | 1.67:1 | 32 | 23,500 | 35,200 |
| 7 | GDGE 2/3 + APO | 1.63:1 | 30 | 10,600 | 14,300 |
| 8* | | 1:1.67 | 28 | 9,900 | 9,400 |

*This is a typical binder system of U.S. Patent 3,432,370 which was prepared and tested for purposes of comparison. The epoxy resin is a diglycidyl ether of polypropylene glycol containing 27 percent oxygen and the curing agent is a perchlorate modified amine terminated polypropylene oxide having an average molecular weight of 2,000 and containing 28 percent oxygen.

We claim:
1. An illuminating flare composition which comprises:
   (a) from 21 to 50 percent of a particulate alkali metal nitrate or perchlorate ranging in size from 10 to 750μ in the longest dimension as oxidizer;
   (b) from 43 to 70 percent of particulate magnesium ranging in size from 25 to 250μ in the longest dimension; and
   (c) the reaction product of an amine or acid anhydride curable epoxy resin and an amine terminated polyalkylene oxide, alkylene polyamine, alkyl, aryl or mixed alkyl-aryl amine or acid anhydride in which the epoxy resin accounts for from 30 to 70 percent of the copolymer as binder, the binder being further characterized by containing at least 30 percent chemically combined oxygen and making up from 18 to 24 percent of the flare composition.

2. The composition of claim 1 which contains from 45 to 55 percent essentially spherical magnesium particles ranging in size from 125 to 250μ in diameter and from 25 to 33 percent sodium nitrate particles having mean diameters from 25 to 250μ as oxidizer.

3. The composition of claim 1 wherein the epoxy resin is glycerine diglycidyl ether or a glycerine glycidyl ether having a functionality of between 2 and 3.

4. The composition of claim 1 wherein the binder is the copolymeric reaction product of the nitrate or perchlorate salt of an amine terminated polyalkylene oxide having an average molecular weight of 250 and an amine curable epoxy resin.

5. The composition of claim 4 wherein the epoxy resin is glycerine diglycidyl ether or a glycerine glycidyl ether having a functionality of between 2 and 3.

6. The composition of claim 2 wherein the binder is the copolymeric reaction product of glycerine diglycidyl ether or a glycerine glycidyl ether having a functionality of between 2 and 3 and an amine terminated polyalkylene oxide having an average molecular weight of 250.

7. The composition of claim 6 wherein the binder is the reaction product of the glycerine diglycidyl ether or glycerine glycidyl ether having a functionality of between 2 and 3 and the partial nitrate or perchlorate salt of an amine terminated polyalkylene oxide having an average molecular weight of 250.

References Cited

UNITED STATES PATENTS

| | | | |
|---|---|---|---|
| 3,419,445 | 12/1968 | Markels | 149—19 |
| 3,432,370 | 3/1969 | Bash et al. | 149—19 |
| 3,454,436 | 7/1969 | Bedell | 149—19 |
| 3,565,706 | 2/1971 | Waite | 149—19 |

CARL D. QUARFORTH, Primary Examiner

E. A. MILLER, Assistant Examiner

U.S. Cl. X.R.

149—20, 21, 44, 112, 113, 114